United States Patent
Lindner et al.

(10) Patent No.: US 9,410,615 B2
(45) Date of Patent: Aug. 9, 2016

(54) ACTIVATION APPARATUS FOR A TRANSMISSION OF A MOTOR VEHICLE

(71) Applicant: Bayerische Motoren Werke Aktiengesellschaft, Munich (DE)

(72) Inventors: Matthias Lindner, Graefelfing (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 211 days.

(21) Appl. No.: 14/249,824

(22) Filed: Apr. 10, 2014

(65) Prior Publication Data

US 2014/0216194 A1    Aug. 7, 2014

Related U.S. Application Data

(63) Continuation of application No. PCT/EP2012/071781, filed on Nov. 5, 2012.

(30) Foreign Application Priority Data

Nov. 28, 2011  (DE) .......................... 10 2011 087 162

(51) Int. Cl.
  *F16H 59/10*   (2006.01)
  *F16H 61/18*   (2006.01)
  *F16H 59/02*   (2006.01)

(52) U.S. Cl.
  CPC .............. *F16H 59/105* (2013.01); *F16H 61/18* (2013.01); *F16H 2059/0221* (2013.01); *Y10T 74/2003* (2015.01)

(58) Field of Classification Search
  CPC .......... F16H 59/105; F16H 2059/0221; F16H 61/18; F16H 59/10
  See application file for complete search history.

(56) References Cited

U.S. PATENT DOCUMENTS

2002/0166399 A1* 11/2002 Nagasaka et al. ............... 74/335
2007/0082780 A1*  4/2007 Tenbrock et al. ............... 477/34
2012/0022756 A1*  1/2012 Ueno et al. ..................... 701/58

FOREIGN PATENT DOCUMENTS

| DE | 102 08 387 A1 | 10/2002 |
| DE | 10 2005 047 891 A1 | 4/2007 |
| DE | 10 2007 023 281 A1 | 11/2008 |
| DE | 10 2009 031 649 A1 | 1/2011 |
| DE | 10 2009 057 953 A1 | 6/2011 |
| JP | 2007-30762 A | 2/2007 |
| JP | 2008-155727 A | 7/2008 |
| WO | WO 2010110098 A1 * | 9/2010 |

OTHER PUBLICATIONS

International Search Report dated Dec. 18, 2012 with English translation (five (5) pages).
German-language Written Opinion (PCT/ISA/237) dated Dec. 18, 2012 (six (6) pages).
German-language Search Report dated Jun. 26, 2012 with English translation (ten (10) pages).

* cited by examiner

*Primary Examiner* — Huan Le
(74) *Attorney, Agent, or Firm* — Crowell & Moring LLP

(57) ABSTRACT

An activation apparatus is provided for a transmission of a motor vehicle, having a gear selector that is moveable in at least one shift gate for selecting different drive program of the transmission, a control device with which the selection of at least one drive program of the transmission can be locked, and at least two sensors designed for detecting a gear selector activation. The control device is designed for determining the plausibility of signals detected by the sensors and for enabling the selection of the drive program on the basis of the plausibility determination.

16 Claims, 1 Drawing Sheet

ACTIVATION APPARATUS FOR A TRANSMISSION OF A MOTOR VEHICLE

CROSS REFERENCE TO RELATED APPLICATIONS

This application is a continuation of PCT International Application No. PCT/EP2012/071781, filed Nov. 5, 2012, which claims priority under 35 U.S.C. §119 from German Patent Application No. 10 2011 087 162.4, filed Nov. 28, 2011, the entire disclosures of which are herein expressly incorporated by reference.

BACKGROUND AND SUMMARY OF THE INVENTION

The present invention relates to an activation apparatus for a transmission of a motor vehicle having a gear selector, which can be moved in at least one shift gate, for selecting different drive programs of the transmission, and having a control device, by which the selection of at leas one drive program of the transmission can be locked. The method further relates to a method of activating a control device for locking and unlocking at least one drive program of a transmission of a motor vehicle.

As a rule, an activation apparatus having a gear selector is provided in the vehicle interior of known vehicles for activating automatic vehicle transmissions, which gear selector can be moved by the driver in a shift gate for selecting different drive programs for the forward drive, for the reverse drive and for selecting a neutral position of the transmission. The activation of the gear selector results in a control command that is transmitted to a transmission control device. Added to the above-mentioned drive programs is a parking lock circuit which, in the case of some activation apparatuses, can also be selected by use of the gear selector and, in the case of other activation apparatuses, can be selected by use of an activation pushbutton provided specifically for this purpose and arranged, for example, on the gear selector or adjacent to the latter. When the parking lock is activated, the transmission will be mechanically locked.

In order to avoid unintended activations of the gear selector and thereby an unintended drive program change, a control device is additionally provided which locks the selection of drive programs by means of the gear selector. In order to permit a controlled intended activation of the gear selector, an activation pushbutton is provided for unlocking the selection of the drive programs. When the driver wants to select a drive program, he has to keep the activation pushbutton depressed while he activates the gear selector.

An activation apparatus for a transmission has become known, which originates from the applicant, has a gear selector movable in a shift gate for selecting drive programs, and a control device by which the selecting of the drive programs of the transmission can be locked. In addition, an activation pushbutton for activating a parking lock is provided on the upper end of the gear selector. The selecting of drive programs by use of the gear selector is at first locked, so that the gear selector will not be unintentionally activated. For unlocking the selection of drive programs, an activating switch is provided which is arranged laterally of the gear selector and which has to be mechanically activated so that the gear selector can be moved in the shift gate. In order to select a drive program, the driver, while he is moving the gear selector in the shift gate, has to constantly hold the activation switch in a pressed condition, so that the selection of the drive program is unlocked.

Although the known activation apparatus for selecting drive programs of a transmission already proven itself in practice, there are still possibilities for an improvement. So that the driver can select a drive program, the activation switch arranged laterally on the gear selector has to be mechanically activated during the entire time period the driver needs for activating the gear selector. The necessity of having to activate a mechanical switch for selecting drive programs has a limiting effect on comfort, on the one hand, and, on the other hand, a mechanical switch will always be subject to wear. In addition, a mechanical switch is relatively expensive in its production and requires a lot of installation space in the area of the gear selector.

It is therefore an object of the present invention to provide an activation apparatus for a transmission of a motor vehicle by which the selecting of drive programs will be more comfortable for the driver. In addition, the activation apparatus is to be less susceptible to wear and should be able to be installed in a vehicle in a more cost-effective manner than a known activation apparatus. In addition, a method is to be provided for activating a control device for locking and unlocking the selection of at least one drive program of a transmission, which makes it possible for the driver to select drive programs in a more comfortable manner.

With respect to the apparatus, the invention achieves this and other objects by providing an activation apparatus, and method, for a transmission of a motor vehicle, having a gear selector, which can be moved in at least one shift gate, for selecting different drive programs of the transmission, and having a control device, by which the selecting of at least one drive program of the transmission can be locked. At least two sensors are designed for detecting a gear selector activation, the control device being designed for determining the plausibility of detection signals of the sensors and for unlocking the selection of the drive program as a function of determining the plausibility.

As a rule, the drive programs that can be selected by use of the gear selector are a forward drive, often marked "D", a reverse drive "R" and a neutral position "N". Depending on the vehicle type, a sports mode "S" may be added, and possibly a drive program in which the driver can shift manually when driving forward, in which case he can decide himself when a new gear position is to be engaged, and then triggers a signal by means of activating the gear selector, which signal is forwarded to an actuator in the transmission, which then sets the corresponding gear ratio at the transmission.

The main purpose of locking the selection of drive programs by way of the control device is to prevent an unintended activation of the gear selector and thereby an unintended selection of a drive program. Such an unintended selection, without the activation apparatus according to the invention, could be triggered, for example, by an activation of the gear selector by the front passenger or by an unintended touching of the gear selector by the driver. Such an unintended selection is prevented by the activation apparatus according to the invention.

By use of the at east two sensors of the activation apparatus, basically different forms of the activation of the gear selector can be detected, thus, intended as well as unintended forms. When the gear selector is activated, the sensors generate detection signals which are forwarded to the control device. The sensors, which are designed for the detection of the gear selector activation, may be arranged, for example, on the gear selector, adjacent to the latter, or in the area of the shift gate of the vehicle.

By way of the control device, the plausibility of the detection signals of the sensors is determined, and a differentiation is made, particularly between plausible and implausible detection signals. Unintended or improper activations of the gear selector result in detection signals that are determined to be implausible. Such implausible detection signals are generated, for example, when the driver's hand unintentionally brushes against the gear selector because he wants to operate an activation pushbutton situated adjacent to the gear selector, or, for example, also when the front passenger tries to activate the gear selector. In contrast, an activation that results in plausible detection signals is an activation that is intended by the driver and is to be used for selecting a drive program.

When the result of a plausibility check leads to the conclusion that the activation of the gear selector intentional the selection of drive programs will continue to be locked. When, in contrast, plausible detection signals were detected, the control device will unlock the selection of the drive program. In this case, a selection is a signal-triggering mechanical activation of the gear selector. When the driver selects a drive program, the control device will output a corresponding signal to an actuator in the transmission, which will then trigger a position in the transmission which corresponds to the selected drive program.

In contrast to the known activation apparatus, during the activation of the gear selector, the driver therefore does not constantly have to keep a mechanical activation pushbutton depressed in order to unlock the selection of drive programs. This is more comfortable for the driver. The driver first has to feel or find the pushbutton with his finger and then activate it, which takes time. The unlocking of the selection of drive programs therefore takes place faster in the case of an activation apparatus according to the invention. As opposed to a mechanical activation pushbutton, in the case of the activation apparatus according to the invention, there are also no mechanical contacting problems of the mechanical activation pushbutton. In addition, the activation apparatus according to the invention is less susceptible to wear than the known activation apparatus because a mechanical switch may get stuck or break. In addition, during the installation of an activation apparatus according to the invention into a vehicle, no mechanical activation switch for unlocking the selection of drive programs has to be installed at the gear selector. The activation apparatus according to the invention is therefore also more space-saving.

According to a preferred embodiment, at least one of the sensors is arranged on the, or adjacent to, the gear selector. Several sensors may also be present on the gear selector or adjacent to it, and a combination of at least one sensor that is arranged on the gear selector and another sensor that is arranged adjacent to the gear selector is also contemplated.

According to a preferred embodiment, at least one of the sensors is a capacitive proximity sensor. Such a proximity sensor will react when the driver approaches or touches the contact area of the sensor.

Such a sensor contains, for example, a capacitor on a silicon substrate having two integrated capacitor plates whose distance from one another can be changed. The capacity of the capacitor can therefore also be changed as a function of an application or pressure. This sensor is provided, for example, in an area on the gear selector with which a portion of the driver's palm or the driver's finger comes in contact when he touches the gear selector for activating it. When the driver touches the corresponding location on the gear selector, the sensor will output a signal to the control device.

According to a preferred embodiment of the invention, at least one of the sensors is an optical sensor for the detection of the driver's arm movement. The optical sensor preferably detects whether the driver is even moving his arm. The signals of the optical sensor may, in this case, also only represent a snapshot of a certain position within the scope of a complete arm movement.

Preferably at least one optical sensor as well as at least one capacitive proximity sensor are provided. By use of the optical sensor, it can, for example, be determined that the driver is moving his arm toward the gear selector, and, by use of the capacitive sensor it can subsequently be determined that the driver is touching the gear selector with his hand. The combination of these sensor-detected actions by the driver permit the conclusion that the driver is intentionally activating the gear selector.

Preferably, at least two capacitive proximity sensors and one optical sensor are arranged on the gear selector. In this manner, at least three signals are emitted which supply information on whether a driver is intentionally activating the gear selector. The redundancy of information increases the signal quality of the signals emitted by the sensors. When, for example, a front passenger touches the gear selector, although the two capacitive proximity sensors output a corresponding signal, the optical sensor rill recognize that the driver's arm has not moved toward the gear selector. In this case, the selection of drive programs would not be unlocked in order to prevent the improper activation of the gear selector.

According to a further development of the invention, the control device for the unlocking of the selection of the drive programs is designed as a function of a predetermined signal pattern. The signal pattern has the purpose of differentiating between unintended, improper, activations of the gear selector and the resulting implausible detection signals and intended activations and the resulting plausible detection signals. When the detection signals of the sensors correspond to the signal pattern, they are considered to be plausible detection signals.

The content of a predetermined signal pattern is, for example, that all sensors output a detection signal in a certain sequence or simultaneously. However, the content of the signal pattern may also, for example, be that some specified sensors output a signal the other sensors output no signal. The latter makes sense, for example, when at least one sensor is provided, in which case the fact that this sensor outputs a signal indicates improper activation of the gear selector is taking place.

The activation apparatus according to the invention further preferably has an activation device for activating and/or deactivating a parking lock, which activation device is arranged on the gear selector or adjacent to it. As a rule, the activation device is an activation push button arranged on the gear selector or adjacent to it.

A method of activating a control device for locking and unlocking the selection of at least one drive program of a transmission of a motor vehicle is also an object of the invention. It is provided here that a gear selector activation be detected by way of at least two sensors, that the detection signals of the sensors be checked for plausibility, and that the selecting of the drive programs be unlocked as a function of the determined plausibility. The determination of the plausibility takes place as described above in connection with the activation apparatus according to the invention.

According to a further aspect of the method according to the invention, the selection of the drive programs is unlocked when the detection signals of the sensors correspond to a predetermined signal pattern.

According to a preferred embodiment, the selection of the drive programs will be unlocked, for example, when the detection signal of at least one predetermined sensor exceeds a defined threshold value or when the detection signal of at least one predetermined sensor falls below a defined threshold value.

In this case, different threshold values may also be defined for different sensors. Thus, the prerequisite for the unlocking of the selection of drive programs may, for example, be that the signal of a first sensor exceeds a specified first threshold value, the signal of a second sensor falls below a specified second threshold value, and a third sensor outputs no detection signal during that time. In this manner, a very precise differentiation can be made between intended and unintended activations of the gear selector.

According to a preferred embodiment of the method according to the invention, the selection of the drive programs is, for example, unlocked when the detection signal of at least one sensor exceeds or falls below a defined threshold value during a predetermined time period. In this manner, it is avoided that so-called background noise of the sensors—in other words, a faulty output of signals—has the result that the selection of drive programs is unlocked in the case of an improper activation of the gear selector. For an activation, it is therefore, for example, necessary that two capacitive sensors arranged on the gear selector output a detection signal at least for 200 milliseconds, and that the optical sensor outputs a corresponding signal at least for 300 milliseconds, which indicates that the driver is moving his arm toward the gear selector.

In addition, according to the invention, embodiments of the method are also provided, in the case of which the selection of drive programs is unlocked when at least one predetermined sensor outputs no detection signal during a specified time period. In this case, a detection signal of the predetermined sensor would, for example, point to an improper use of the gear selector.

According to the method, several of the above-described prerequisites for the situation at the selection of drive programs is unlocked, can be combined. The selection of drive programs will therefore, for example, be unlocked when a first sensor outputs a detection signal during a predetermined time period whose signal strength exceeds a defined first threshold value, and simultaneously, a second sensor has outputted no detection signal during a predetermined time period which exceeds a defined second threshold value.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
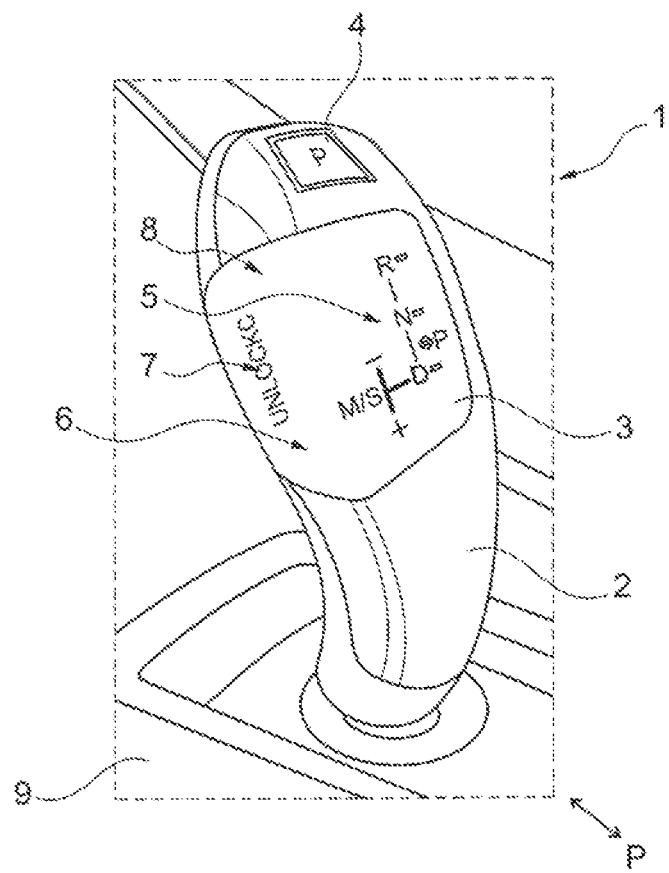
FIG. 1 is a perspective view of an embodiment of an activation apparatus according to the invention.

FIG. 1 is a perspective view of an embodiment of an activation apparatus 1 according to the invention for a transmission of a motor vehicle (not shown in detail). The activation apparatus 1 has a gear selector 2 for selecting different drive programs, which gear selector 2 can be moved in a shift gate. The moving directions of the gear selector 2 within the shift gate are outlined via the double arrow P.

In this embodiment of the gear selector 2, the drive programs are indicated in an optical display easily recognizable for the driver by way of corresponding letters, such as "D" for forward drive, in the illustrated embodiment of the gear selector 2, a reverse driving position "R", a neutral position "N" and a forward driving position "D" are present, which can be selected by way of movements of the gear selector 2 in the shift gate. The currently selected drive program is displayed to the driver in the optical display 3 in that a light element is activated which is arranged in each case below or in the letter pertaining to the selected drive program.

An activation pushbutton 4 for activating a parking lock is additionally provided on the gear selector 2. When the driver presses the activation pushbutton 4 while the vehicle is stationary, the parking lock will be activated, and can be disengaged again during a subsequent renewed operating of the gear selector that was checked for plausibility.

In the illustrated embodiment of the activation apparatus 1, in addition, a further drive program can be selected by an activation of an activation switch 9 arranged adjacent to the gear selector 2. This drive program is exited again by a renewed activation of the activation switch 9, and a return takes place into the normal drive mode. Finally, by the implementation of a orthogonal movement with respect to the direction of the arrow P, by way of the gear selector 2, in the plane of the figure to the left, a manual shifting program can also be set when the forward driving program is selected. By means of another implementation of this movement, this manual shifting program is exited again. When the manual shifting program is activated, the driver can shift between gear positions of the transmission by slightly moving the gear selector 2 in the direction of the arrow P. When the driver, for example, presses the gear selector toward the front, a signal is output to an actuator in the transmission, which actuator shifts up one gear position.

Figure 2:
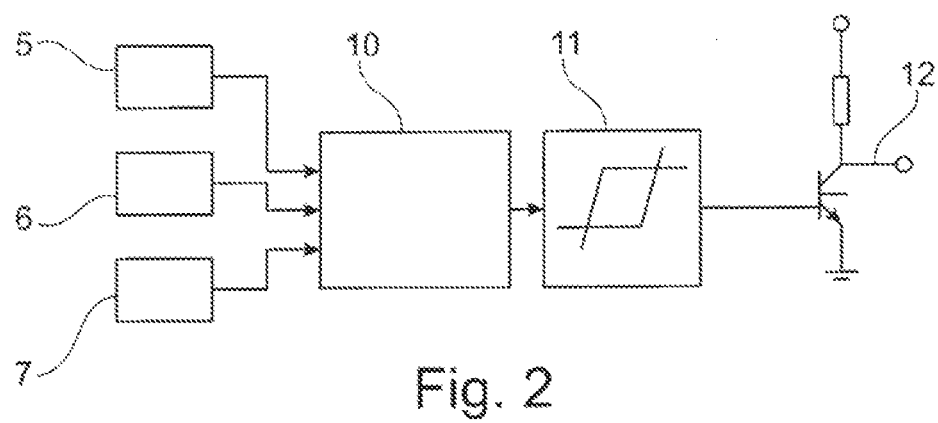
FIG. 2 is a block diagram of an embodiment of an activation apparatus according to the invention.

The selection of the drive programs is at first locked by a control device 10 illustrated in FIG. 2 in order to avoid an accidental improper activation of the gear selector 2.

So that a differentiation can be made between an intended activation of the gear selector 2 by the driver and an unintended or improper activation, sensors 5, 6, 7 for the detection of an activation of the gear selector 2 are provided on the gear selector 2. The detection signals of the sensors 5, 6, 7 are checked for their plausibility by the control device 10 illustrated in FIG. 2, and only if the detection signals correspond to a predetermined signal pattern, will the detection signal be considered to be plausible, which points to an intended gear selector activation.

The sensors 5, 6 and 7 are arranged in the area of a contact surface 8 of the gear selector lever 2, which contact surface is provided with the word "unlock", in order signal to the drive that he has to touch the concerned contact surface 8 with his hand so that he can activate the gear selector 2. Two of the sensors 5 and 6 are capacitive proximity sensors. These sensors 5 and 6 output a detection signal to the control device 10 when the driver exercises pressure with his hand upon the concerned locations on which the sensors 5, 6 are arranged.

The sensor 7 is designed as an optical proximity sensor. This sensor 7 detects whether the driver's arm is approaching the gear selector 2. This optical proximity sensor 7 outputs a corresponding signal to the control device 10 when a movement of the driver's arm was detected.

When optical proximity sensor 7 signals that the driver's arm is approaching the gear selector 2, and the two capacitive pressure sensors 5, 6 indicate that pressure is applied to the corresponding location of the contact surface 8, the control device 10 will unlock the selection of drive programs.

FIG. 2 is a block diagram of the activation apparatus 1 according to the invention perceptively illustrated in FIG. 1. In the case of the illustrated embodiment, signals are outputted to the control device 10 by way of a total of three sensors—the two capacitive pressure sensors 5, 6 and the optical proximity sensor 7.

The control device 10 analyzes the detection signals of the sensors 5, 6, 7 and determines whether they correspond to a predetermined signal pattern. On the basis of its processing, the control device 10 outputs an output signal to a threshold value switch 11. In the illustrated embodiment, the threshold-value switch 11 is a Schmitt-Trigger. The latter outputs a minimal output voltage to an output stage 12 when the input signal from the control device 10 falls below a defined threshold value. However, as soon as the input signal exceeds the defined threshold value during a defined time period, the threshold value switch 11 will output a maximal output voltage. When the maximal output voltage is forwarded to the output stage 12, the output stage will unlock the selection of drive programs by way of the gear selector 2 illustrated in FIG. 1. As long as the output voltage of the threshold value of the threshold value switch 11 is maximal, the selection of drive programs will remain unlocked. As soon as the output voltage of the threshold value switch 10 drops back to the minimum, the selection of drive programs will be locked again.

LIST OF REFERENCE SYMBOLS

1 Activation apparatus
2 Gear selector
3 Display for drive programs
4 Activation pushbutton
5 Capacitive proximity sensor
6 Capacitive proximity sensor
7 Optical proximity sensor
8 Contact surface
9 Activation switch
10 Control device
11 Threshold value switch
12 Output stage
P Double arrow.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An activation apparatus for a transmission of a motor vehicle, comprising:
    a gear selector movable in at least one shift gate for selecting different drive programs of the transmission;
    a control device operatively coupled with the gear selector, the control device being operable to lock a selection of at least one drive program of the different drive programs of the transmission;
    at least two sensors of differing types designed for detecting a gear selector activation, the at least two sensors being coupled with the control device; and
    wherein the control device is designed to determine a plausibility of detection signals from the at least two sensors, wherein the detection signals include one or more of: (i) a plausible detection signal indicating that the gear selector activation was intended and (ii) an implausible detection signal indicating that the gear selector activation was unintended or improper, and to unlock the selection of the at least one drive program as a function of the plausibility determination.

2. The activation apparatus according to claim 1, wherein the control device is designed to unlock the selection of the at least one drive program as a function of a predetermined signal pattern of the detection signals from the at least two sensors.

3. The activation apparatus according to claim 1, further comprising:
    an activation device arranged on or adjacent to the gear selector, the activation device being operable to activate and/or deactivate a parking lock.

4. The activation apparatus according to claim 1, wherein one of the at least two sensors is a capacitive proximity sensor.

5. The activation apparatus according to claim 4, wherein other one of the at least two sensors is an optical sensor arranged to detect arm movement.

6. The activation apparatus according to claim 5, wherein the control device is designed to unlock the selection of the at least one drive program as a function of a predetermined signal pattern of the detection signals from the at least two sensors.

7. The activation apparatus according to claim 6, further comprising:
    an activation device arranged on or adjacent to the gear selector, the activation device being operable to activate and/or deactivate a parking lock.

8. The activation apparatus according to claim 1, wherein one of the at least two sensors is arranged on or adjacent to the gear selector.

9. The activation apparatus according to claim 8, wherein the one of the at least two sensors is a capacitive proximity sensor.

10. The activation apparatus according to claim 8, wherein the one of the at least two sensors is an optical sensor arranged to detect arm movement.

11. A method of operating a control device that locks and unlocks a selection of a drive program of a transmission of a motor vehicle, the method comprising the acts of:
    receiving, by the control device, detection signals from at least two sensors designed to detect a gear selector activation;
    determining, by the control device, a plausibility of the detection signals from the at least two sensors, wherein the detection signals include one or more of: (i) a plausible detection signal indicating that the gear selector activation was intended and (ii) an implausible detection signal indicating that the gear selector activation was unintended or improper; and
    unlocking the selection of the drive program of the transmission as a function of the plausibility determination.

12. The method according to claim 11, wherein the selection of the drive program is unlocked when a detection signal from at least one predetermined sensor of the at least two sensors exceeds or falls below a defined threshold value.

13. The method according to claim 11, wherein the selection of the drive program is unlocked when a detection signal from at least one sensor of the at least two sensors exceeds or falls below a defined threshold value during a predetermined time period.

14. The method according to claim 11, wherein the act of determining the plausibility is carried out by determining that the detection signals from the at least two sensors correspond to a predetermined signal pattern, in which case the selection of the drive program is unlocked.

15. The method according to claim 14, wherein the selection of the drive program is unlocked when a detection signal from at least one predetermined sensor of the at least two sensors exceeds or falls below a defined threshold value.

16. The method according to claim 14, wherein the selection of the drive program is unlocked when a detection signal from at least one sensor of the at least two sensors exceeds or falls below a defined threshold value during a predetermined time period.

* * * * *